(12) United States Patent
Ito et al.

(10) Patent No.: US 11,372,292 B2
(45) Date of Patent: Jun. 28, 2022

(54) ELECTRO-OPTICAL DEVICE AND ELECTRONIC DEVICE

(71) Applicant: SEIKO EPSON CORPORATION, Tokyo (JP)

(72) Inventors: Satoshi Ito, Higashihiroshima (JP); Shotaro Izawa, Nagoya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/347,699

(22) Filed: Jun. 15, 2021

(65) Prior Publication Data

US 2021/0389634 A1 Dec. 16, 2021

(30) Foreign Application Priority Data

Jun. 16, 2020 (JP) .............................. JP2020-103562

(51) Int. Cl.
*G02F 1/1362* (2006.01)
*G02F 1/1368* (2006.01)

(52) U.S. Cl.
CPC ...... *G02F 1/136209* (2013.01); *G02F 1/1368* (2013.01); *G02F 1/136286* (2013.01)

(58) Field of Classification Search
CPC ......... G02F 1/136209; G02F 1/136286; G02F 1/1368
See application file for complete search history.

(56) References Cited

U.S. PATENT DOCUMENTS

| | | | | |
|---|---|---|---|---|
| 6,452,241 B1* | 9/2002 | Fukata | .............. | H01L 29/42384 257/350 |
| 2002/0071072 A1 | 6/2002 | Ohtani et al. | | |
| 2004/0257489 A1* | 12/2004 | Gotoh | ................. | H01L 27/1255 257/E27.113 |
| 2019/0331972 A1* | 10/2019 | Nimura | .............. | G02F 1/136286 |
| 2019/0391455 A1* | 12/2019 | Izawa | ............... | G02F 1/136286 |

FOREIGN PATENT DOCUMENTS

| | | |
|---|---|---|
| JP | 2002-149087 A | 5/2002 |
| JP | 2003-307725 A | 10/2003 |
| JP | 2006-003920 A | 1/2006 |
| JP | 2010-117399 A | 5/2010 |
| JP | 2011-186362 A | 9/2011 |
| JP | 2013-182144 A | 9/2013 |
| JP | 2017-142512 A | 8/2017 |
| JP | 2019-219608 A | 12/2019 |

* cited by examiner

*Primary Examiner* — James A Dudek
(74) *Attorney, Agent, or Firm* — Oliff PLC (57) ABSTRACT

Included are: a semiconductor layer including a drain region, a channel region, and a second LDD region between the drain region and the channel region; a gate electrode disposed overlapping the channel region; a gate wiring line electrically coupled to the gate electrode; and a second light shielding portion disposed between the second LDD region and the gate wiring line and overlapping the second LDD region and the gate wiring line in plan view.

8 Claims, 9 Drawing Sheets

ELECTRO-OPTICAL DEVICE AND ELECTRONIC DEVICE

The present application is based on and claims priority from JP Application Serial Number 2020-103562, filed on Jun. 16, 2020, the disclosure of which is hereby incorporated by reference herein in its entirety.

BACKGROUND

1. Technical Field

The present disclosure relates to an electro-optical device and an electronic device.

2. Related Art

An active-drive type liquid crystal device that includes a pixel including a switching element has been known as an electro-optical device. Such a liquid crystal device is used, for example, as a light valve of a projector serving as an electronic device.

The liquid crystal device has a problem in that a TFT property changes if strong light coming, for example, from a laser light source of the projector enters the semiconductor layer of the transistor. For example, JP-A-2010-117399 discloses a technique in which a wiring line for gate potential is provided so that portions from a channel portion of a semiconductor layer to an LDD region overlap with each other to improve a light shielding property of the LDD region.

However, the technique of JP-A-2010-117399 has a problem in that the TFT property changes if the LDD region and the wiring line for gate potential are disposed too close to each other in order to improve the light shielding property.

SUMMARY

An electro-optical device includes a semiconductor layer including a drain region, a channel region, and an LDD region between the drain region and the channel region, a gate electrode disposed overlapping the channel region, a first light shielding portion electrically coupled to the gate electrode, and a second light shielding portion disposed between the LDD region and the first light shielding portion and overlapping the LDD region and the first light shielding portion in plan view.

An electronic device includes the electro-optical device described above.

DESCRIPTION OF EXEMPLARY EMBODIMENTS

Figure 1:
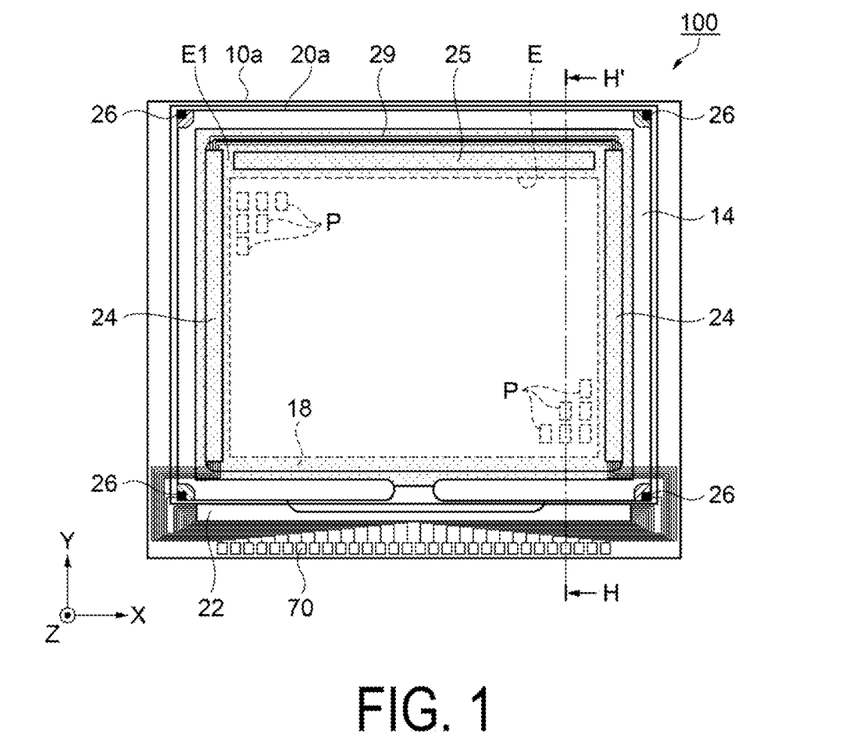
FIG. 1 is a plan view illustrating a configuration of a liquid crystal device according to this embodiment.
Figure 2:
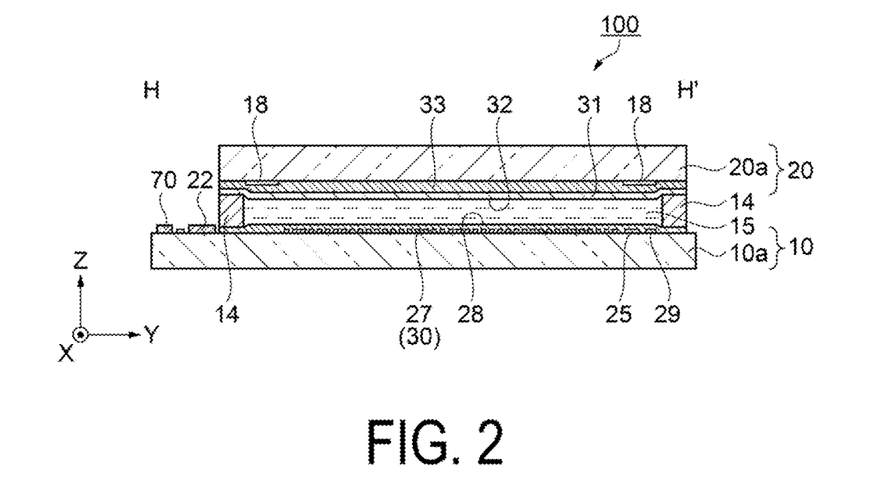
FIG. 2 is a cross-sectional view taken along the H-H' line of the liquid crystal device illustrated in FIG. 1.

As illustrated in FIGS. 1 and 2, a liquid crystal device 100 according to the present embodiment serving as an electro-optical device includes an element substrate 10 and a counter substrate 20, which are disposed so as to be opposed to each other, and also includes a liquid crystal layer 15 interposed between these paired substrates. For example, glass, quartz, or the like is used for a first base member 10a serving as a substrate that forms the element substrate 10 and a second base member 20a that forms the counter substrate 20.

The element substrate 10 is larger than the counter substrate 20. These substrates are joined to each other through a seal material 14 disposed along the outer periphery of the counter substrate 20. A liquid crystal having positive or negative dielectric anisotropy is enclosed in a space between them to form the liquid crystal layer 15.

For example, an adhesive such as thermosetting or ultraviolet curing epoxy resin is used for the seal material 14. For example, a spacer is mixed in the seal material 14 to maintain a constant space between the paired substrates.

A display region E in which a plurality of pixels P that contribute to displaying are arranged is provided on the inner side of the seal material 14. A peripheral area E1 provided with a peripheral circuit or the like that does not contribute to displaying is disposed around the display region E.

A data-line drive circuit 22 is provided between one side portion of the element substrate 10 and the seal material 14 located along this one side portion. Furthermore, an inspection circuit 25 is provided between the display region E and the seal material 14 located along another one side portion opposed to the above-described one side portion. In addition, a scanning line drive circuit 24 is provided between the display region E and the seal material 14 located along other two side portions intersecting the one side portion at right angles and opposed to each other. In addition, a plurality of wiring lines 29 that couple the two scanning line drive circuits 24 are provided between the inspection circuit 25 and the seal material 14 located along the other one side portion opposed to the one side portion.

A light shielding film 18 similarly having a frame shape is provided on an inner side of the seal material 14 disposed in a frame manner on the counter substrate 20 side. The light shielding film 18 is made out, for example, of a metal or metallic oxide having a light reflection property. The display region E having a plurality of pixels P is formed on the inner side of the light shielding film 18. For example, tungsten silicide (WSi) can be used for the light shielding film 18.

The wiring lines coupled to the data-line drive circuit 22 and the scanning line drive circuit 24 are coupled to a plurality of external connection terminals 70 arranged along the one side portion. In the description below, the X direction represents a direction extending along the one side portion, and the Y direction represents a direction extending along other two side portions intersecting the one side portion at right angles and opposed to each other. In addition, the view from the Z direction is referred to as plan view.

As illustrated in FIG. 2, the surface of the first base member 10a on the liquid crystal layer 15 side includes a pixel electrode 27 having optical transparency and provided for each of the pixels P, a thin film transistor (hereinafter, referred to as a "transistor 30") serving as a switching element, a data line (not illustrated), and a first alignment film 28 that covers these elements.

The pixel electrode 27 is an electrically conductive transparent film, for example, made of indium tin oxide (ITO) or the like. The element substrate 10 according to the present disclosure includes, at least, the pixel electrode 27, the transistor 30, and the first alignment film 28.

The surface of the counter substrate 20 on the liquid crystal layer 15 side includes the light shielding film 18, an insulating layer 33 formed in a form of film so as to cover the light shielding film 18, a common electrode 31 provided so as to cover the insulating layer 33, and a second alignment film 32 that covers the common electrode 31. The counter substrate 20 according to the present disclosure includes, at least, the light shielding film 18, the common electrode 31, and the second alignment film 32.

The light shielding film 18 surrounds the display region E as illustrated in FIG. 1, and is provided at a position that overlaps with the scanning line drive circuit 24 and the inspection circuit 25 in plan view. This makes it possible to block light entering the peripheral circuits including these drive circuits from the counter substrate 20 side, thereby functioning to prevent the peripheral circuits from malfunctioning due to the light. In addition, the light shielding film 18 blocks light so that unnecessary stray light does not enter the display region E, thereby achieving high contrast in display at the display region E.

The insulating layer 33 is made, for example, of an inorganic material such as silicon oxide, and has optical transparency. The insulating layer 33 is provided so as to cover the light shielding film 18. A method of forming such an insulating layer 33 includes a film forming method using a chemical vapor deposition (CVD) method, for example.

The common electrode 31 is an electrically conducting transparent film made, for example, of ITO. In addition, the common electrode 31 covers the insulating layer 33 and is electrically coupled to the wiring line on the element substrate 10 side through an up-down electrically continuous portion 26 provided at each of four corners of the counter substrate 20 as illustrated in FIG. 1.

The first alignment film 28 that covers the pixel electrode 27 and the second alignment film 32 that covers the common electrode 31 are selected on the basis of optical design of the liquid crystal device 100. The first alignment film 28 and the second alignment film 32 include an inorganic alignment film obtained by using a vapor deposition method to form a film of an inorganic material such as silicon oxide (SiOx) and orienting the film substantially vertically with respect to liquid crystal molecules having negative dielectric anisotropy.

For example, such a liquid crystal device 100 has a transmission type, and employs a normally white mode or normally black mode in terms of the optical design. In the normally white mode, the transmittance of a pixel P when no voltage is applied is greater than the transmittance when a voltage is applied. In the normally black mode, the transmittance of a pixel P when no voltage is applied is smaller than the transmittance when a voltage is applied. In use, a polarizing element is disposed at each of the light entrance side and the light exit side so as to correspond to the optical design. Note that it may be possible to apply to a liquid crystal device having a reflective type.

Figure 3:
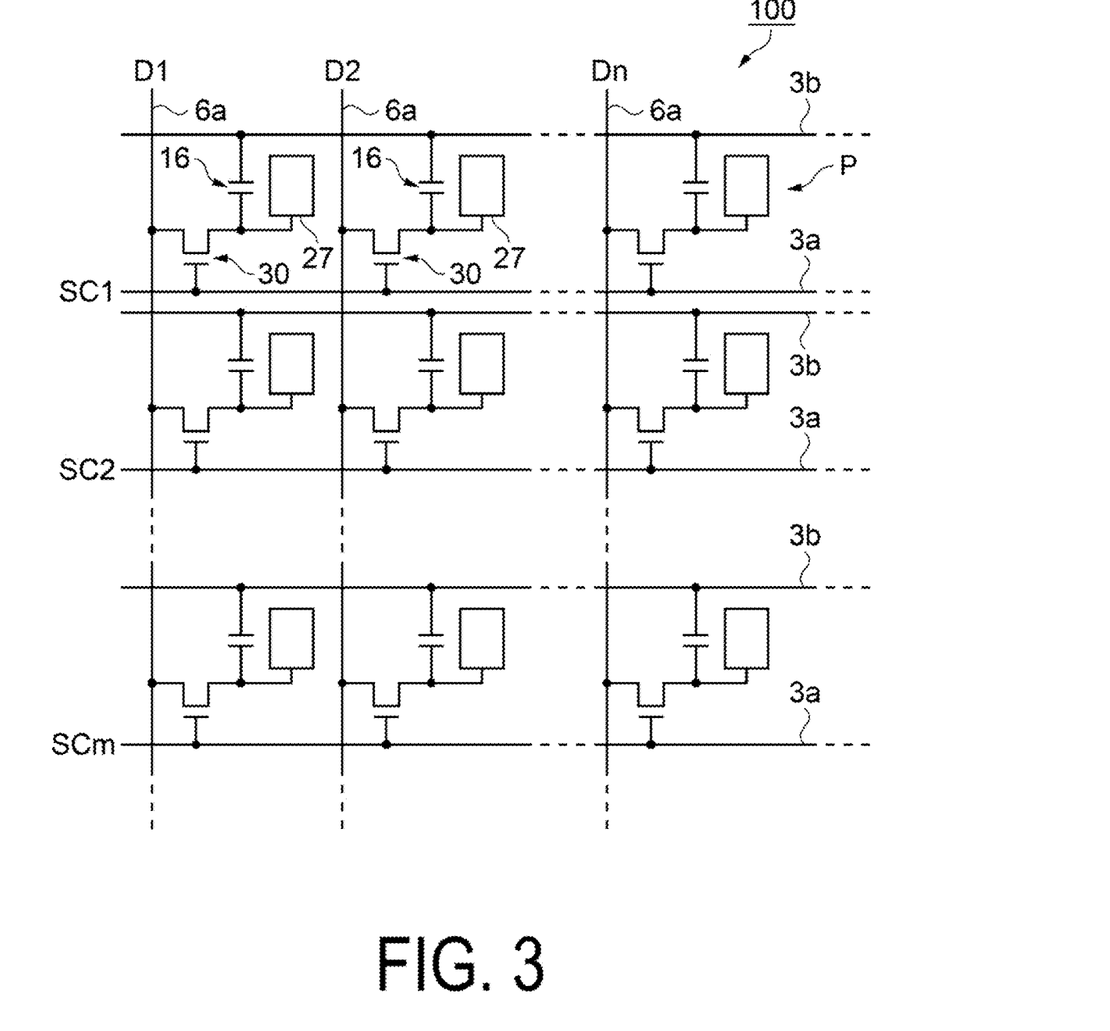
FIG. 3 is an equivalent circuit diagram illustrating an electrical configuration of the liquid crystal device.

As illustrated in FIG. 3, the liquid crystal device 100 includes a plurality of scanning lines 3a and a plurality of data lines 6a, which are insulated from each other at least in the display region E and are perpendicular to each other, and also includes a capacitance line 3b. For example, the X direction is a direction in which the scanning lines 3a extend, and the Y direction is a direction in which the data lines 6a extend.

The scanning line 3a, the data line 6a, the capacitance line 3b, the pixel electrode 27, the transistor 30, and a capacitance element 16 are provided to constitute a pixel circuit of a pixel P. The pixel electrode 27, the transistor 30, and the capacitance element 16 are provided in a region defined by the signal lines of the scanning line 3a, the data line 6a, and the capacitance line 3b.

The scanning line 3a is electrically coupled to a gate of the transistor 30. The data line 6a is electrically coupled to a source region of the transistor 30. The pixel electrode 27 is electrically coupled to the drain region of the transistor 30.

The data line 6a is coupled to the data-line drive circuit 22 (see FIG. 1) to supply the pixel P with image signals D1, D2, ..., Dn supplied from the data-line drive circuit 22. The scanning line 3a is coupled to the scanning line drive circuit 24 (see FIG. 1) to supply each of the pixels P with scanning signals SC1, SC2, ..., SCm supplied from the scanning line drive circuit 24.

The image signals D1 to Dn supplied from the data-line drive circuit 22 to the data line 6a may be supplied in this order in a line sequential manner, or may be supplied on a group-by-group basis, the group being comprised of a plurality of data lines 6a adjacent to each other. The scanning line drive circuit 24 supplies, in a line sequential manner, the scanning line 3a with the scanning signals SC1 to SCm in a form of pulse at predetermined timing.

The liquid crystal device 100 is configured such that, upon input of the scanning signals SC1 to SCm, the transistor 30 serving as a switching element is brought into an ON state only for a certain period, which causes the image signals D1 to Dn supplied from the data line 6a to be written in the pixel electrode 27 at predetermined timing. In addition, the image signals D1 to Dn at a certain level written in the liquid crystal layer 15 through the pixel electrode 27 are retained for a certain period of time between the pixel electrode 27 and the common electrode 31 disposed so as to be opposed to the pixel electrode 27 with the liquid crystal layer 15 being interposed therebetween.

In order to prevent the retained image signals D1 to Dn from leaking, the capacitance element 16 is coupled in parallel with a liquid crystal capacitor formed between the pixel electrode 27 and the common electrode 31. The capacitance element 16 has a dielectric layer serving as a capacitor film provided between two capacitor electrodes.

Figure 4:
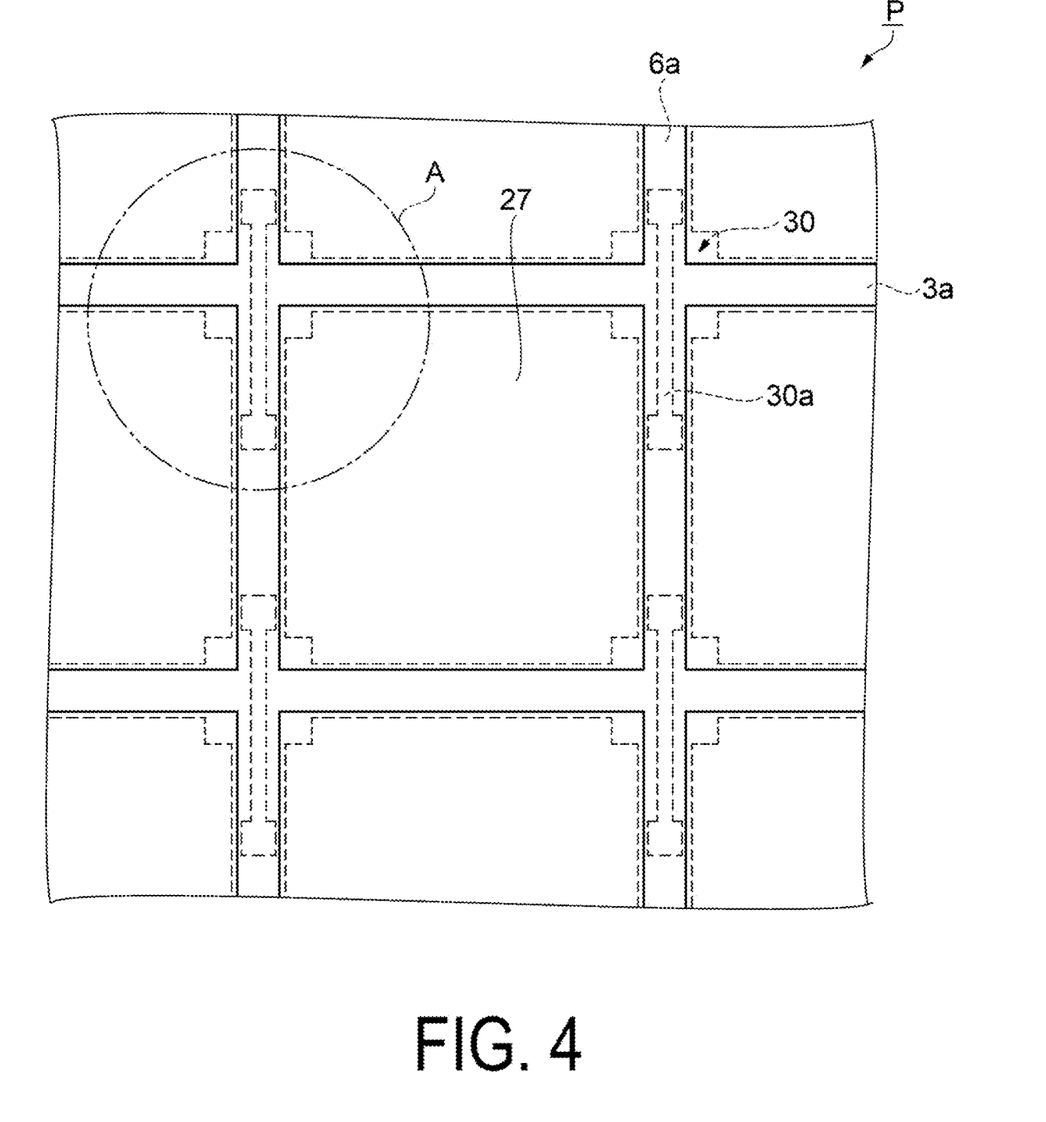
FIG. 4 is a plan view illustrating a configuration of pixels.

As illustrated in FIG. 4, in the pixel P, the data line 6a and the scanning line 3a are disposed between a pixel electrode 27 and a pixel electrode 27 that are adjacent to each other. In addition, the transistor 30 is disposed in a portion where the data line 6a and the scanning line 3a intersect each other.

Figure 5:
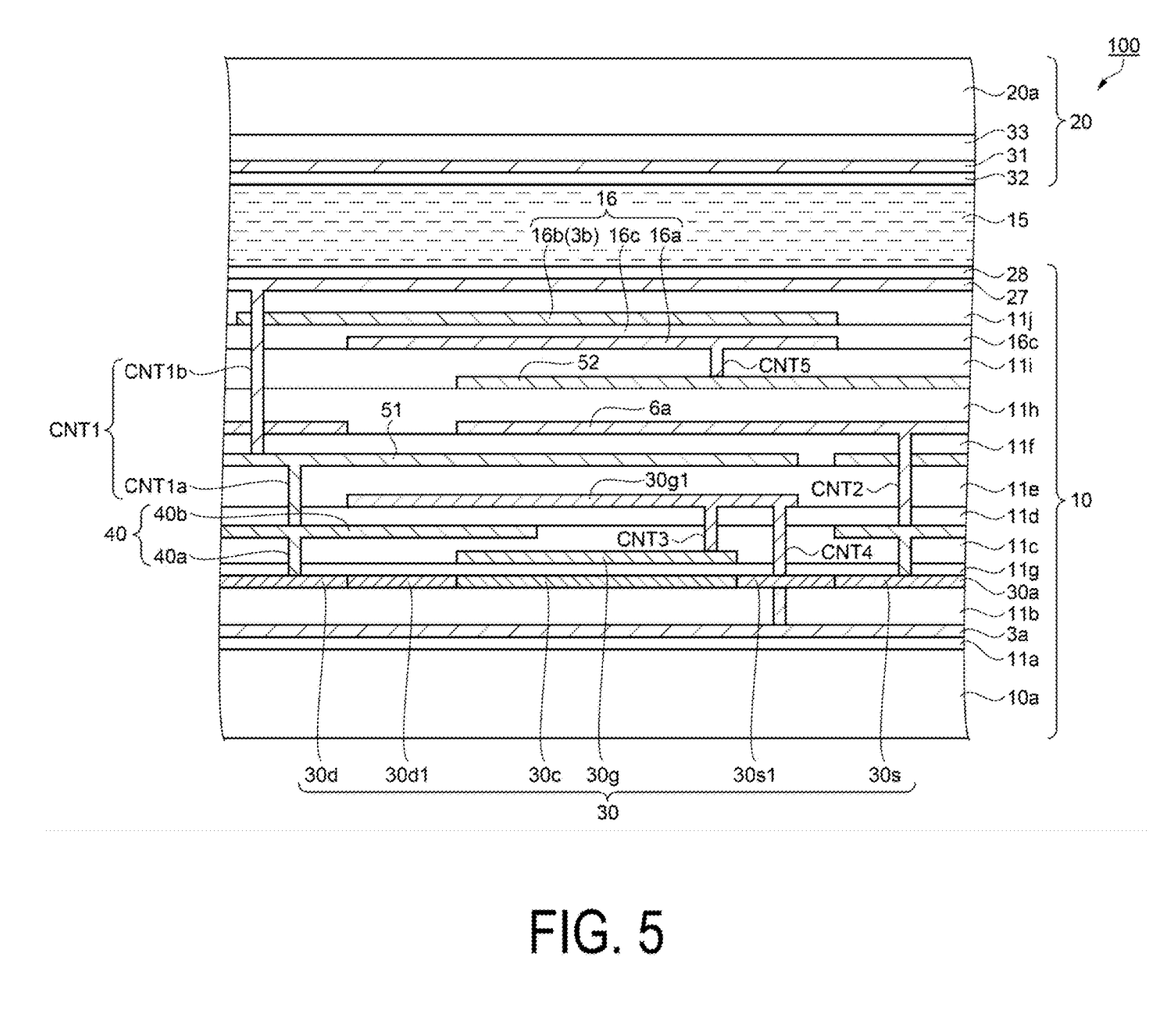
FIG. 5 is a cross-sectional view illustrating a configuration of the liquid crystal device.

As illustrated in FIG. 5, the liquid crystal device 100 includes the element substrate 10 and the counter substrate 20 disposed so as to be opposed to the element substrate 10. The first base member 10a that constitutes the element substrate 10 is made, for example, of quartz. The element substrate 10 includes, on the first base member 10a, the scanning line 3a, the transistor 30, the data line 6a, the capacitance element 16, the pixel electrode 27, and the first alignment film 28.

Specifically, an insulating layer 11a made, for example, of silicon oxide is disposed above the first base member 10a. The scanning line 3a that also functions as a light shielding film made, for example, of tungsten silicide (WSi) is disposed above the insulating layer 11a.

An insulating layer 11b made, for example, of silicon oxide is disposed above the scanning line 3a and the insulating layer 11a. The transistor 30 is disposed above the insulating layer 11b.

The transistor 30 has, for example, a lightly doped drain (LDD) structure, and includes a semiconductor layer 30a made, for example, of polysilicon (polycrystalline silicon of high purity), a gate insulation layer 11g formed above the semiconductor layer 30a, and a gate electrode 30g formed above the gate insulation layer 11g and made, for example, of aluminum.

The semiconductor layer 30a is formed as an n-type transistor 30, for example, by injecting n-type impurity ions such as phosphorus (P) ions. Specifically, the semiconductor layer 30a includes a channel region 30c, a first LDD region 30s1, a source area 30s, a second LDD region 30d1 serving as an LDD region, and a drain region 30d.

The channel region 30c is doped with p-type impurity ions such as boron (B) ions. The other regions (30s1, 30s, 30d1, 30d) are doped with n-type impurity ions such as phosphorus (P) ions.

An insulating layer 11c made, for example, of silicon oxide is disposed above the gate electrode 30g and the gate insulation layer 11g. A second light shielding portion 40 having a dual damascene structure is provided above the insulating layer 11c and the gate insulation layer 11g. Specifically, the second light shielding portion 40 includes an electrode 40a, and a light shielding film 40b having a thickness less than the thickness of the electrode 40a. The electrode 40a is electrically coupled to the drain region 30d of the semiconductor layer 30a. The light shielding film 40b is disposed so as to cover the second LDD region 30d1.

An insulating layer 11d is disposed above the second light shielding portion 40 and the insulating layer 11c. A gate wiring line 30g1 electrically coupled to the gate electrode 30g through a contact hole CNT3 and serving as a first light shielding portion made, for example, of aluminum is disposed above the insulating layer 11d. The gate wiring line 30g1 is electrically coupled to the scanning line 3a through a contact hole CNT4.

An insulating layer 11e made, for example, of silicon oxide is disposed above the gate wiring line 30g1 and the insulating layer 11d. A relay wiring line 51 electrically coupled to the second light shielding portion 40 through a contact hole CNT1a and made, for example, of aluminum is disposed above the insulating layer 11e. An insulating layer 11f made, for example, of silicon oxide is disposed above the relay wiring line 51 and the insulating layer 11e.

The data line 6a electrically coupled to the source area 30s through a contact hole CNT2 is disposed above the insulating layer 11f. An insulating layer 11h made, for example, of silicon oxide is provided above the data line 6a and the insulating layer 11f. A common wiring line 52 to which a common potential is applied is disposed above the insulating layer 11h. An insulating layer 11i made, for example, of silicon oxide is disposed above the common wiring line 52.

The capacitance element 16 is disposed above the insulating layer 11i. Specifically, the capacitance element 16 includes, for example, a first capacitance electrode 16a serving as a capacitance electrode on the fixed potential side, a second capacitance electrode 16b electrically coupled to the drain region 30d of the transistor 30, and a dielectric layer 16c disposed between the first capacitance electrode 16a and the second capacitance electrode 16b. The first capacitance electrode 16a and the second capacitance electrode 16b are made, for example, of aluminum. The dielectric layer 16c is made, for example, of silicon nitride. The first capacitance electrode 16a is electrically coupled to the common wiring line 52 through a contact hole CNT5.

An insulating layer 11j made, for example, of silicon oxide is disposed above the capacitance element 16. The pixel electrode 27 electrically coupled to the second capacitance electrode 16b through a contact hole CNT1 is formed above the insulating layer 11j. The pixel electrode 27 is an electrically conducting transparent film made, for example, of ITO or the like.

The first alignment film 28 obtained through diagonal vapor deposition of an inorganic material such as silicon oxide is disposed above the pixel electrode 27. The liquid crystal layer 15 in which liquid crystal or the like is enclosed in a space surrounded by the seal material 14 is disposed above the first alignment film 28.

Meanwhile, the counter substrate 20 includes, on the second base member 20a (on the liquid crystal layer 15 side), the insulating layer 33, the common electrode 31, and the second alignment film 32. The second base member 20a is made, for example, of quartz. The insulating layer 33 is made, for example, of silicon oxide. The common electrode 31 is an electrically conducting transparent film made, for example, of ITO. The second alignment film 32 is formed through diagonal vapor deposition of an inorganic material such as silicon oxide.

In a state where no electric field is generated between the pixel electrode 27 and the common electrode 31, the liquid crystal layer 15 exhibits a predetermined alignment state with the alignment films 28 and 32. Next, the configuration of a portion of pixel P will be described with reference to FIGS. 6 and 7.

Figure 6:
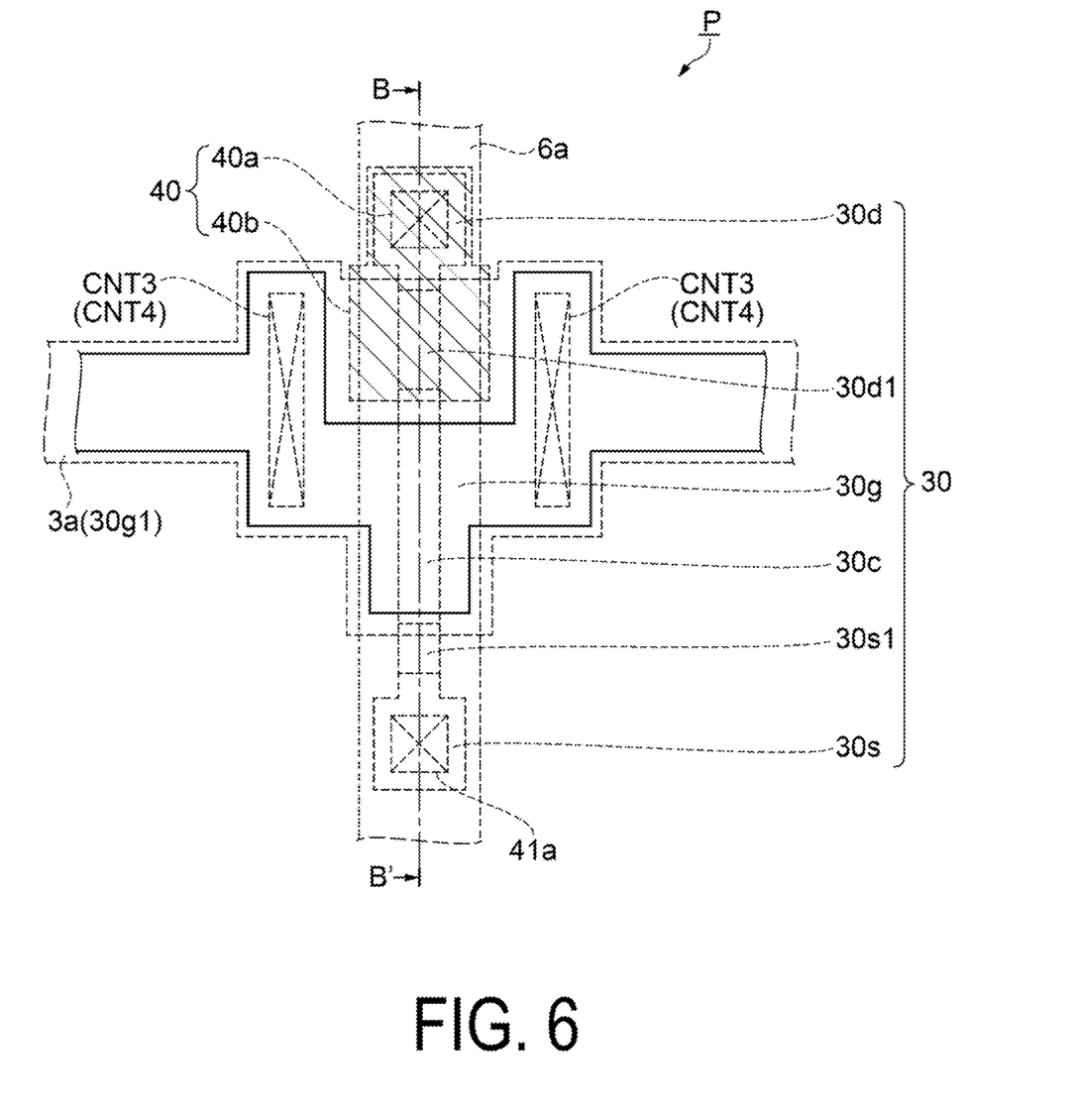
FIG. 6 is a plan view illustrating, in an enlarged manner, the portion A of the pixels illustrated in FIG. 4.
Figure 7:
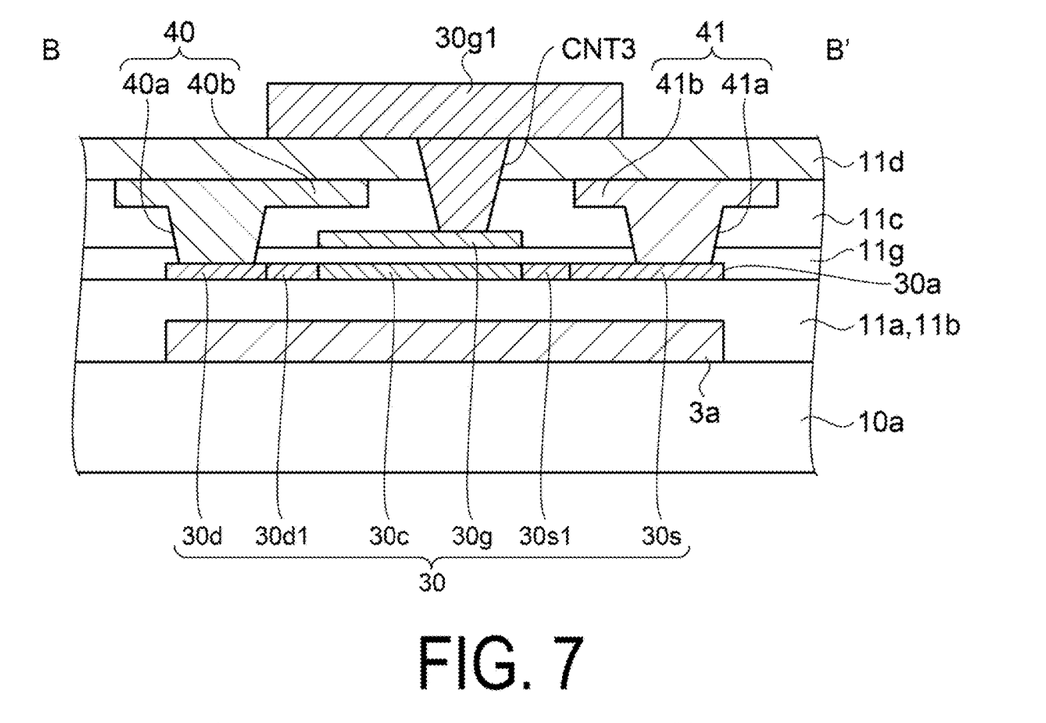
FIG. 7 is a cross-sectional view taken along the B-B' line of a transistor illustrated in FIG. 6.

FIG. 6 is a plan view illustrating the structure of a pixel P of the element substrate 10 in a simplified manner. FIG. 7 is a cross-sectional view illustrating the structure of the transistor 30 from the first base member 10a to the gate wiring line 30g1 of the element substrate 10.

As illustrated in FIGS. 6 and 7, the transistor 30 is disposed so as to overlap with a portion where the data line 6a and the scanning line 3a intersect each other in plan view. As illustrated in FIG. 7, the second light shielding portion 40 is disposed between the gate electrode 30g and the gate wiring line 30g1 in cross-sectional view. Specifically, the second light shielding portion 40 has a dual damascene structure as described above. As illustrated in FIG. 6, the light shielding film 40b of the second light shielding portion 40 is disposed so as to overlap with the second LDD region 30d1 in plan view.

Furthermore, the second LDD region 30d1 is disposed so as to also overlap with the gate wiring line 30g1 disposed at an upper layer of the second light shielding portion 40. On the other hand, the source area 30s is electrically coupled to the light shielding portion 41 of the dual damascene structure. The light shielding portion 41 includes an electrode 41a and a light shielding film 41b.

As described above, the light shielding film 40b of the second light shielding portion 40 is disposed between the second LDD region 30d1 and the gate wiring line 30g1 in cross-sectional view, and is disposed so as to overlap with the second LDD region 30d1 and the gate wiring line 30g1 in plan view. This makes it possible to suppress the influence of a gate potential on the second LDD region 30d1. Thus, it is possible to achieve both the desired TFT property and the light shielding property of the second LDD region 30d1. In addition, since the gate wiring line 30g1 extends over the upper layer of the second light shielding portion 40, it is possible to further improve the light shielding property of the second LDD region 30d1.

Figure 8:
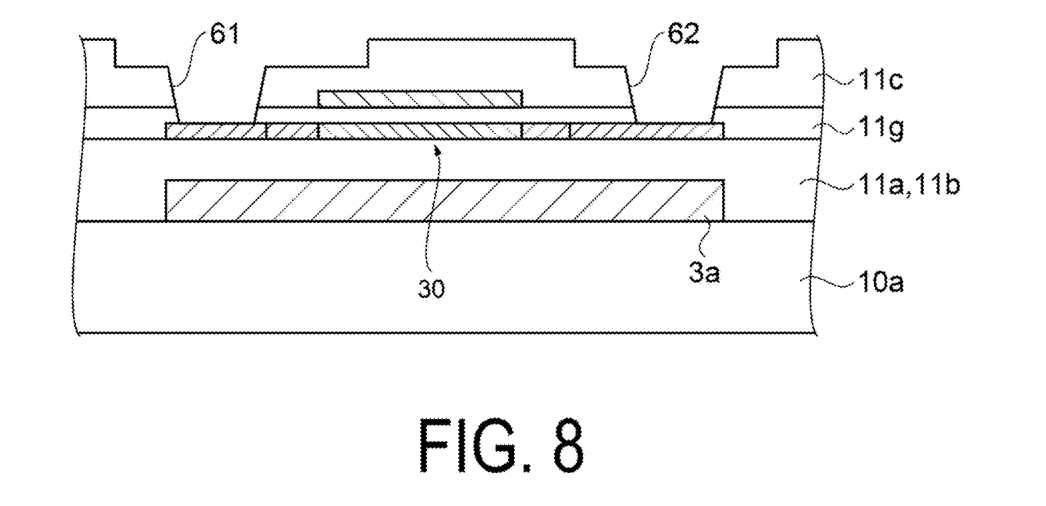
FIG. 8 is a cross-sectional view illustrating a portion of a method of manufacturing a transistor.

Next, a method of manufacturing the transistor 30 will be described with reference to FIGS. 8 to 10. First, the scanning line 3a, the insulating layers 11a and 11b, the semiconductor layer 30a, the gate insulation layer 11g, the gate electrode 30g, and the insulating layer 11c are formed above the first base member 10a as illustrated in FIG. 8. Next, in the insulating layer 11c and the gate insulation layer 11g, groove portions (also referred to as recesses) 61, 62 are formed through an etching process so as to couple to the source area 30s and the drain region 30d of the semiconductor layer 30a.

Figure 9:
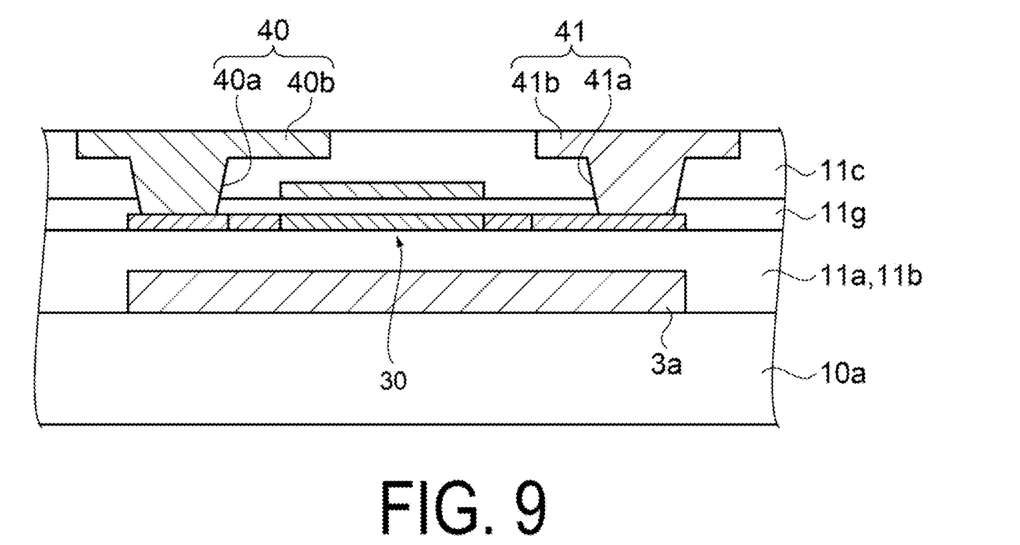
FIG. 9 is a cross-sectional view illustrating a portion of a method of manufacturing a transistor.

Next, as illustrated in FIG. 9, tungsten (W) is embedded into the groove portions 61 and 62 using dual damascene. This makes it possible to form, in the groove portion 61, the second light shielding portion 40 including the electrode 40a coupled to the drain region 30d and the light shielding film 40b formed so as to overlap with the second LDD region 30d1. In addition, the light shielding portion 41 including the electrode 41a coupled to the source area 30s and the light shielding film 41b is formed in the groove portion 62. Note that, by applying a flattening process such as CMP to the upper surfaces of the second light shielding portion 40 and the light shielding portion 41, it is possible to equally set the height of the second light shielding portion 40 and the light shielding portion 41. Furthermore, since dual damascene is used in formation, it is possible to reduce the manufacturing process, thereby being able to reduce the necessary cost.

Figure 10:
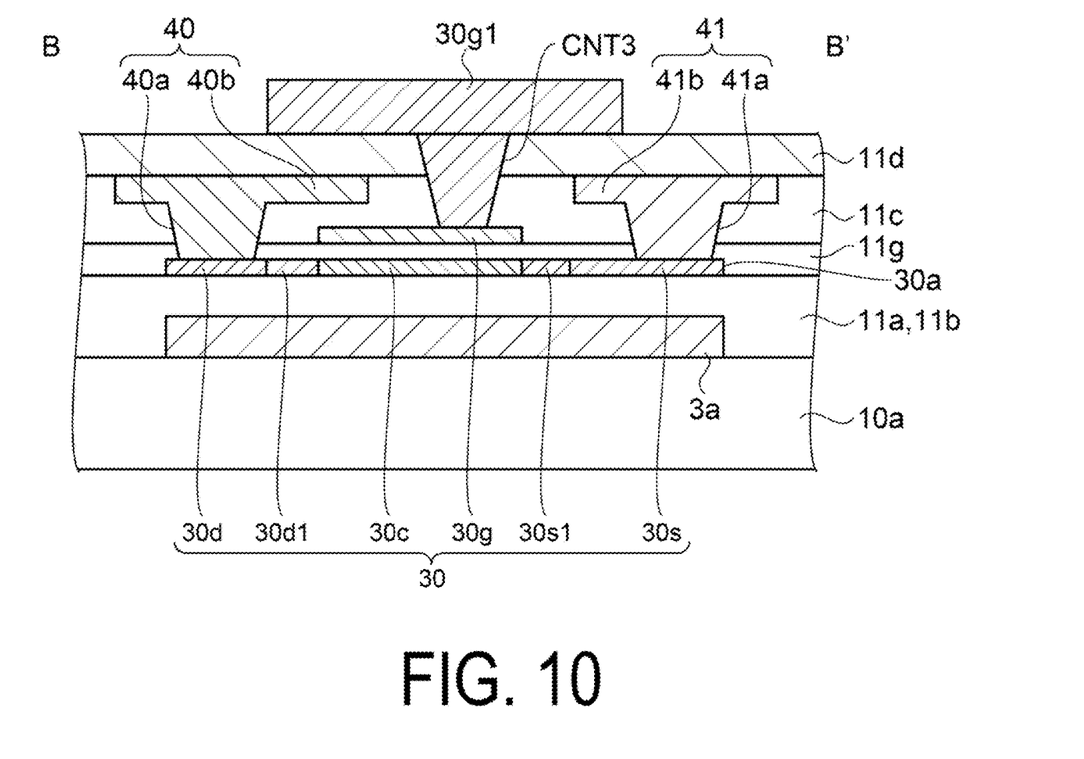
FIG. 10 is a cross-sectional view illustrating a portion of a method of manufacturing a transistor.

Next, as illustrated in FIG. 10, the insulating layer 11d is formed in a film form above the second light shielding portion 40, the light shielding portion 41, and the insulating layer 11c. After this, the contact hole CNT3 coupled to the gate electrode 30g is formed in the insulating layers 11d and 11c. Then, a film of a material for the gate wiring line 30g1 such as aluminum is formed above the opening hole of the contact hole CNT3 and the insulating layer 11d to perform patterning, thereby forming the gate wiring line 30g1 electrically coupled to the gate electrode 30g.

Note that, after the second light shielding portion 40 and the light shielding portion 41 are formed through dual damascene, the upper surfaces of the second light shielding portion 40 and the light shielding portion 41 are flattened. Thus, after this, it is possible to form the insulating layer 11d so as to be thin. This makes it possible to easily control the thickness of the insulating layer 11d and decrease the distance between the second light shielding portion 40 and the gate wiring line 30g1, thereby being able to improve the light shielding property. Furthermore, since the gate wiring line 30g1 is disposed above the second light shielding portion 40, it is possible to extensively cover the second LDD region 30d1.

Figure 11:
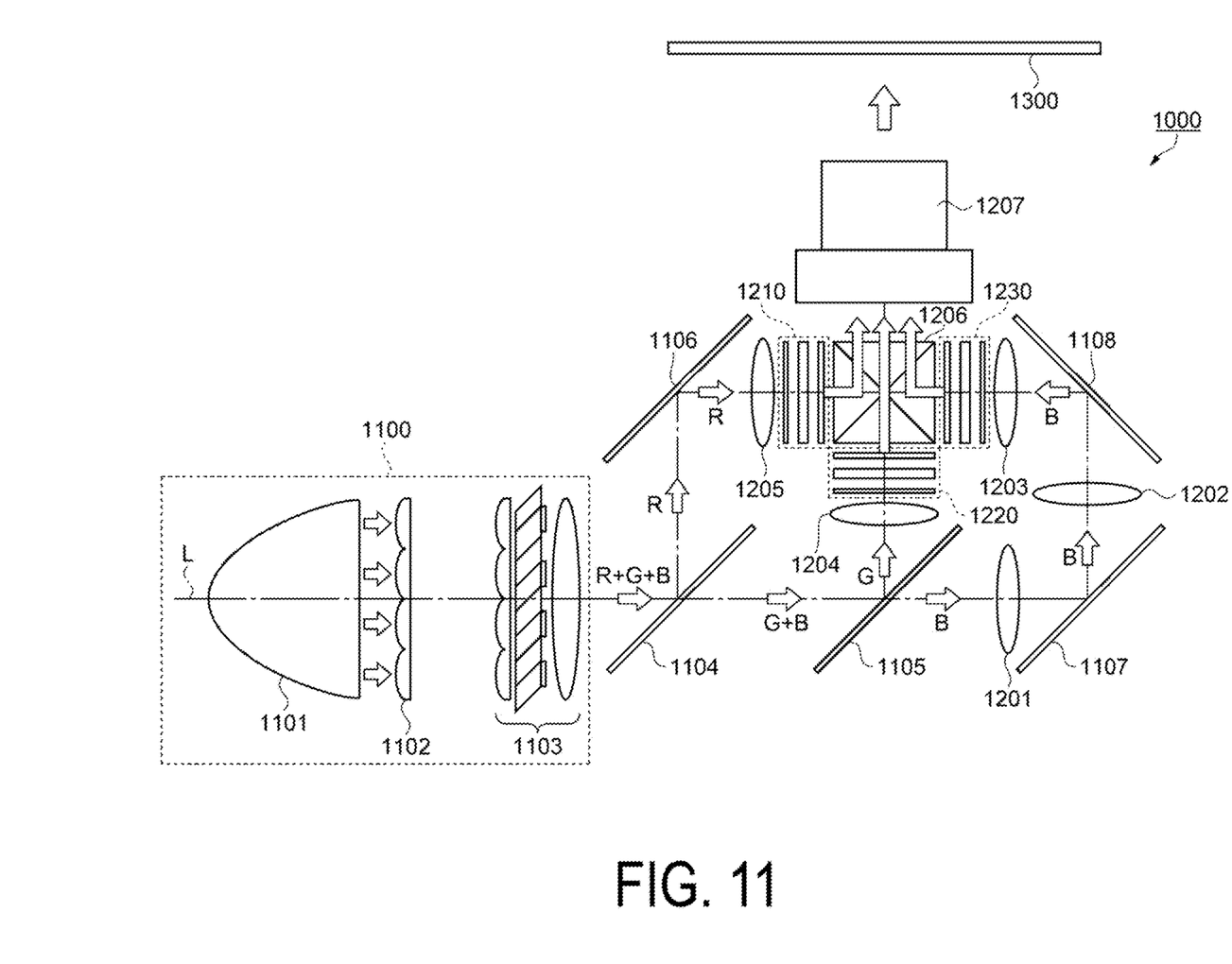
FIG. 11 is a schematic diagram illustrating a configuration of a projector serving as an electronic device.

As illustrated in FIG. 11, a projector 1000 according to this embodiment includes: a polarized-light illumination device 1100 disposed along a system optical axis L; two dichroic mirrors 1104 and 1105 each serving as a light separating element; three reflection mirrors 1106, 1107, and 1108; five relay lenses 1201, 1202, 1203, 1204, and 1205; transmission-type liquid crystal light valves 1210, 1220, and 1230 serving as three light modulators; a cross dichroic prism 1206 serving as a light combining element; and a projection lens 1207.

The polarized-light illumination device 1100 generally includes a lamp unit 1101 serving as a white light source such as an extra-high pressure mercury lamp or a halogen lamp, an integrator lens 1102, and a polarization conversion element 1103.

The dichroic mirror 1104 reflects the red light (R) of a polarized light beam outputted from the polarized-light illumination device 1100 and allows the green light (G) and the blue light (B) to pass through. The other dichroic mirror 1105 reflects the green light (G) transmitted by the dichroic mirror 1104 and allows the blue light (B) to pass through.

The red light (R) reflected by the dichroic mirror 1104 is reflected by the reflection mirror 1106 and then, enters the liquid crystal light valve 1210 through the relay lens 1205. The green light (G) reflected by the dichroic mirror 1105 enters the liquid crystal light valve 1220 through the relay lens 1204. The blue light (B) that has passed through the dichroic mirror 1105 passes through a light guide system including the three relay lenses 1201, 1202, and 1203 and the two reflection mirrors 1107 and 1108, and enters the liquid crystal light valve 1230.

The liquid crystal light valves 1210, 1220, and 1230 are each disposed so as to be opposed to an incident surface of each type of color light of the cross dichroic prism 1206. The color light that enters the liquid crystal light valves 1210, 1220, and 1230 is modulated on the basis of video information (video signal) and is outputted toward the cross dichroic prism 1206.

This prism includes four rectangular prisms bonded together. On the inner surfaces of the prisms, a dielectric multilayer film configured to reflect the red light and a dielectric multilayer film configured to reflect the blue light are formed in a cross shape. These dielectric multilayer films combine the three types of color light to combine lights representing color images. The combined light is projected onto the screen 1300 through the projection lens 1207 serving as a projection optical system, and the image is enlarged and is displayed.

The liquid crystal light valve 1210 is an element to which the liquid crystal device 100 described above is applied. Note that it is also possible to apply liquid crystal light valve 1210 to a liquid crystal device 200 that will be described later. The liquid crystal device 100 is disposed at a space between a pair of polarizing elements disposed in a crossed-Nicols state at the entrance side and the exit side of color light. This similarly applies to other liquid crystal light valves 1220 and 1230.

Note that, in addition to the projector 1000, the electronic device on which the liquid crystal device 100 is mounted includes a head-up display (HUD), a head-mounted display (HMD), a smartphone, an electrical view finder (EVF), a mobile mini-projector, an electronic book, a mobile phone, a mobile computer, a digital camera, a digital video camera, a display, a vehicle mounted unit, an audio unit, an exposing unit, and an illumination device. The liquid crystal device 100 can be used in various types of electronic devices.

As described above, the liquid crystal device 100 according to this embodiment includes the semiconductor layer 30a including the drain region 30d, the channel region 30c, the second LDD region 30d1 between the drain region 30d and the channel region 30c, the gate electrode 30g disposed so as to overlap with the channel region 30c, and the second light shielding portion 40 disposed between the gate wiring line 30g1 electrically coupled to the gate electrode 30g and the second LDD region 30d1, the second light shielding portion 40 being disposed so as to overlap with the gate wiring line 30g1 and the second LDD region 30d1 in plan view.

With this configuration, the light shielding film 40b of the second light shielding portion 40 is disposed between the second LDD region 30d1 and the gate wiring line 30g1 in cross-sectional view, and is disposed so as to overlap with the second LDD region 30d1 and the gate wiring line 30g1 in plan view. This makes it possible to suppress the influence of a gate potential on the second LDD region 30d1. Thus, it is possible to achieve both the desired TFT property and the light shielding property of the second LDD region 30d1.

In addition, it is preferable that the second light shielding portion 40 includes the electrode 40a coupled to the drain region 30d.

With this configuration, the second light shielding portion 40 includes the electrode 40a to which a drain potential of the drain region 30d is supplied. This makes it possible to suppress the electrical influence on the second LDD region 30d1. In addition, it is possible to improve the light shielding property of the second LDD region 30d1.

Furthermore, it is preferable that: the second light shielding portion 40 includes a film portion having a large thickness in the thickness direction of the liquid crystal device 100, namely, the electrode 40a, and also includes a thin portion, namely, the light shielding film 40b; and the thick film portion is disposed between the second LDD region 30d1 and the gate wiring line 30g1 in cross-sectional view, and is disposed so as to overlap with the second LDD region 30d1 and the gate wiring line 30g1 in plan view.

With this configuration, the thin film portion is disposed between the second LDD region 30d1 and the gate wiring line 30g1 in cross-sectional view, and is disposed so as to overlap with the second LDD region 30d1 and the gate wiring line 30g1 in plan view. This makes it possible to suppress the influence of a gate potential on the second LDD region 30d1. Thus, it is possible to achieve both the desired TFT property and the light shielding property of the LDD region.

In addition, it is preferable that the gate wiring line 30g1 is disposed so as to overlap with the second LDD region 30d1 in plan view.

With this configuration, the gate wiring line 30g1 is disposed so as to overlap with the second LDD region 30d1. This makes it possible to cause it to overlap with the second LDD region 30d1 in conjunction with the second light shielding portion 40. Thus, it is possible to improve the light shielding property.

In addition, it is preferable that the material of the second light shielding portion 40 is tungsten. With this configuration, tungsten is used for the second light shielding portion 40, which makes it possible to enhance the light shielding property, in other words, to suppress a reduction in the OD value.

Furthermore, with the liquid crystal device 100 described above being provided, it is possible to provide the projector 1000 that makes it possible to improve the display quality.

Figure 12:
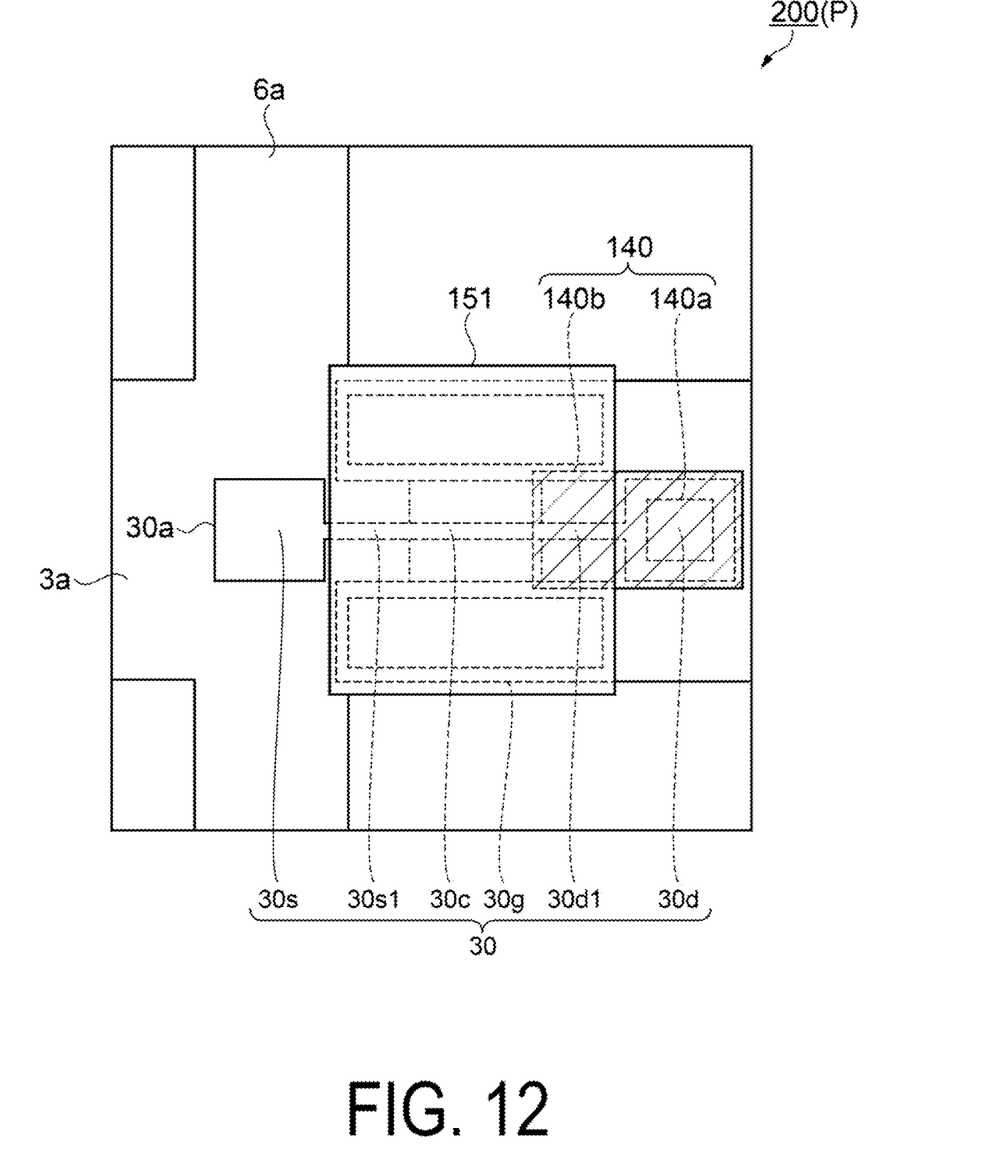
FIG. 12 is a plan view illustrating a configuration of a pixel according to a modification example.

Note that the structure is not limited to the structure of the liquid crystal device 100 described above. For example, it is possible to apply to the structure of a liquid crystal device 200 illustrated in FIG. 12. FIG. 12 is a plan view illustrating a structure of the pixel P, in particular, the transistor 30 of the liquid crystal device 200 according to a modification example.

As illustrated in FIG. 12, in the pixel P of the liquid crystal device 200, a semiconductor layer 30a is disposed along a direction in which the scanning line 3a extends. The semiconductor layer 30a includes a source area 30s disposed in a region that overlaps with the data line 6a, the channel region 30c that overlaps with the gate electrode 30g, the first LDD region 30s1 disposed between the source area 30s and the channel region 30c, the drain region 30d, and the second LDD region 30d1 disposed between the drain region 30d and the channel region 30c.

A light shielding film 151 is disposed above the first LDD region 30s1, the channel region 30c, and the second LDD region 30d1 of the semiconductor layer 30a. As in the embodiment described above, a second light shielding portion 140 electrically coupled to the drain region 30d is disposed between the gate electrode 30g and the light shielding film 151. The second light shielding portion 140 has a dual damascene structure, and includes an electrode 140a electrically coupled to the drain region 30d and a light shielding film 140b having a thickness less than the thickness of the electrode 140a. The light shielding film 140b is disposed so as to cover the second LDD region 30d1.

With this configuration, even if the semiconductor layer 30a is disposed along the data line 6a or is disposed along the scanning line 3a, it is possible to achieve both the desired TFT property and the light shielding property of the second LDD region 30d1, as in the embodiment described above.

Furthermore, the light shielding film 40b, made of tungsten, of the second light shielding portion 40 is not only used to shield the light for the second LDD region 30d1. It may be possible to use it as an etching stopper film for a hole connecting to the contact hole CNT1 at the upper layer. This makes it possible to easily perform control, for example, even when a deep hole of 2 μm or more is etched. Here, for example, as illustrated in FIG. 5, it is possible to apply it to the contact hole CNT1 coupled from the second light shielding portion 40 to the second capacitance electrode 16b. Note that this is not limited to the drain region 30d side, and similarly applies to the source area 30s side.

As described above, it is preferable that the insulating layer 11 disposed so as to cover the second light shielding portion 40 is provided, and the insulating layer 11 includes the contact hole CNT1 extending through the insulating layer 11 and having one end reaching the second light shielding portion 40.

With this configuration, when the contact hole CNT1 is formed deeply in the upper layer of the second light shielding portion 40, it is possible to use the second light shielding portion 40 as a stopper layer.

Furthermore, in addition to the configuration in which the light shielding film 40b of the second light shielding portion 40 is disposed so as to overlap with the second LDD region 30d1, it may be possible to employ a configuration in which the light shielding film 41b of the light shielding portion 41 is disposed so as to overlap with the first LDD region 30s1.

Furthermore, although the electrode 40a and the light shielding film 40b of the second light shielding portion 40 are formed by using the same material of tungsten, the electrode 40a and the light shielding film 40b may be formed by using different materials.

What is claimed is:

1. An electro-optical device comprising:
   a semiconductor layer including a drain region, a channel region, and an LDD region between the drain region and the channel region;
   a gate electrode disposed overlapping the channel region in a thickness direction of the electro-optical device;
   a first light shielding portion electrically coupled to the gate electrode, the gate electrode being between the first light shielding portion and the semiconductor layer in the thickness direction; and a second light shielding portion disposed between the LDD region and the first light shielding portion in the thickness direction and overlapping, in the thickness direction, the LDD region and the first light shielding portion in plan view, at least a part of the second light shielding portion being between the first light shielding portion and the gate electrode in the thickness direction.

2. The electro-optical device according to claim 1, wherein
the second light shielding portion includes an electrode coupled to the drain region.

3. The electro-optical device according to claim 1, wherein
the second light shielding portion includes a first portion and a second portion having a smaller thickness than the first portion in a thickness direction of the electro-optical device, and
the second portion is disposed between the LDD region and the first light shielding portion and overlapping the LDD region and the first light shielding portion in plan view.

4. The electro-optical device according to claim 1, wherein
the first light shielding portion is disposed overlapping the LDD region in plan view.

5. The electro-optical device according to claim 1, wherein
a material of the second light shielding portion is tungsten.

6. The electro-optical device according to claim 1, comprising
an insulating layer disposed so as to cover the second light shielding portion, wherein
the insulating layer includes a contact hole extending through the insulating layer and having one end reaching the second light shielding portion.

7. An electronic device comprising:
the electro-optical device according to claim 1.

8. An electro-optical device comprising:
a semiconductor layer including a drain region, a channel region, and an LDD region between the drain region and the channel region;
a gate electrode disposed overlapping the channel region;
a first light shielding portion electrically coupled to the gate electrode; and
a second light shielding portion disposed between the LDD region and the first light shielding portion and overlapping the LDD region and the first light shielding portion in plan view,
wherein
the second light shielding portion includes a first portion and a second portion having a smaller thickness than the first portion in a thickness direction of the electro-optical device, and
the second portion is disposed between the LDD region and the first light shielding portion and overlapping the LDD region and the first light shielding portion in plan view.

* * * * *